United States Patent
Meyer et al.

(10) Patent No.: US 10,181,641 B2
(45) Date of Patent: Jan. 15, 2019

(54) ANTENNA DEVICE FOR RECEIVING ELECTROMAGNETIC WAVES AND METHOD FOR OPERATING AN ANTENNA DEVICE FOR RECEIVING ELECTROMAGNETIC WAVES

(71) Applicant: Robert Bosch GmbH, Stuttgart (DE)

(72) Inventors: Johannes Meyer, Boeblingen (DE);
Stephan Bannwarth, Gerlingen (DE);
Wolfgang Hafla, Stuttgart (DE);
Juergen Hasch, Stuttgart (DE);
Thomas Binzer, Ingersheim (DE);
Werner Soergel, Pforzheim (DE);
Carsten Potratz, Gerlingen (DE);
Mekdes Girma, Gerlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 352 days.

(21) Appl. No.: 15/174,636

(22) Filed: Jun. 6, 2016

(65) Prior Publication Data
US 2016/0365625 A1 Dec. 15, 2016

(30) Foreign Application Priority Data
Jun. 9, 2015 (DE) .................. 10 2015 210 488

(51) Int. Cl.
*G01S 13/93* (2006.01)
*H01Q 1/32* (2006.01)
*G01S 7/02* (2006.01)
*G01S 7/292* (2006.01)
*H01Q 1/42* (2006.01)
(Continued)

(52) U.S. Cl.
CPC .......... *H01Q 1/3233* (2013.01); *G01S 7/024* (2013.01); *G01S 7/292* (2013.01); *G01S 13/931* (2013.01); *H01Q 1/42* (2013.01); *H01Q 1/525* (2013.01); *G01S 2013/9389* (2013.01); *H01Q 17/005* (2013.01)

(58) Field of Classification Search
CPC .. C23C 4/10; C23C 4/11; C23C 4/127; C23C 4/134; G01S 13/931; G01S 2013/9389; G01S 7/024; G01S 7/292; H01Q 17/005; H01Q 1/3233; H01Q 1/42; H01Q 1/525; H05H 1/42
USPC ............................................. 342/188
See application file for complete search history.

(56) References Cited

U.S. PATENT DOCUMENTS

2012/0200465 A1* 8/2012 Kuhne ................ H01Q 1/3233
343/713

FOREIGN PATENT DOCUMENTS

DE 102013221091 4/2014

\* cited by examiner

*Primary Examiner* — Timothy A Brainard
(74) *Attorney, Agent, or Firm* — Norton Rose Fulbright US LLP; Gerard Messina

(57) ABSTRACT

An antenna device for receiving electromagnetic waves and a method for operating an antenna device. The antenna device is fashioned having: a bearer; at least one receive antenna device situated at an external side of the bearer, for receiving electromagnetic waves having a first polarization; at least one repolarization device situated at the external side of the bearer and fashioned to re-emit electromagnetic waves impinging on the repolarization device having the first polarization as electromagnetic waves having a second polarization; and a filter device situated at the external side of the bearer and fashioned to absorb electromagnetic waves having the second polarization.

12 Claims, 4 Drawing Sheets

(51) Int. Cl.
*H01Q 1/52* (2006.01)
*H01Q 17/00* (2006.01)

ANTENNA DEVICE FOR RECEIVING ELECTROMAGNETIC WAVES AND METHOD FOR OPERATING AN ANTENNA DEVICE FOR RECEIVING ELECTROMAGNETIC WAVES

CROSS REFERENCE

The present application claims the benefit under 35 U.S.C. § 119 of German Patent Application. No. DE 102015210488.5 filed on Jun. 9, 2015, which is expressly incorporated herein by reference in its entirety.

FIELD

The present invention relates to an antenna device for receiving electromagnetic waves, in particular radar waves or millimeter waves, and to a method for operating an antenna device for receiving electromagnetic waves, in particular radar waves or millimeter waves. The antenna device and the method are in particular designed to attenuate or to suppress multiple reflections between the antenna and one or more coverings.

BACKGROUND INFORMATION

Radar sensors are frequently used to acquire the environment surrounding the radar sensor. If the radar sensor is situated on a vehicle, for example the surrounding environment of the vehicle is acquired. For this purpose, the radar sensor sends out electromagnetic waves having specific wave parameters such as frequency and/or modulation. The emitted electromagnetic waves are reflected by external objects that may be present in the surrounding environment of the radar sensor. A portion of the reflected electromagnetic waves is received by the receive antennas, and is then evaluated.

Typically, runtime differences, expressed for example as one or more phase relations between adjacent receive antennas, are measured. Thanks to a known speed of propagation of the electromagnetic waves, in this way the direction of an external object on which the emitted electromagnetic waves have been reflected can be determined (so-called directional or angular estimation).

Frequently, such radar sensors are installed inside a larger object, for example a vehicle, for example behind a bumper of the vehicle. When there is a partial reflection of electromagnetic waves from a bearer of the receive antennas to the bumper, a new reflection of the electromagnetic waves from the bumper back to the receive antennas can take place. This effect can occur several times in succession.

The electromagnetic waves, reflected to the receive antennas once or multiple times, are superposed with the original electromagnetic waves reflected only at the external object. If a runtime difference between different receive antennas, representing different receive channels, is now evaluated, then portions of the undesired single or multiple reflections are also taken into account in the evaluation.

German Patent Application No. DE 10 2013 221 091 A1 describes a radar mounting system integrated in a bumper for use in a vehicle.

SUMMARY

The present invention relates to an antenna device and a method.

In accordance with the present invention, an antenna device is provided having: a bearer; at least one receive antenna device, situated at an external side of the bearer, for receiving electromagnetic waves having a first polarization; at least one repolarization device situated at the external side of the bearer, which is fashioned to re-emit electromagnetic waves impinging on the repolarization device having the first polarization as electromagnetic waves having a second polarization; and a filter device that is situated at the external side of the bearer and that is fashioned to absorb electromagnetic waves having the second polarization.

An external side of the bearer is to be understood in particular as a flat surface that completely faces a particular direction, i.e., whose orientation can be described by a single normal vector. The bearer can also be referred to as a substrate. The external side of the bearer can also be formed by, or can be, a curved surface.

In addition, a method is provided for operating an antenna device for receiving electromagnetic waves, having the steps: reception of electromagnetic waves having a first polarization by at least one receive antenna device at an external side of a bearer; re-emission of electromagnetic waves impinging on the external side of the bearer having the first polarization as electromagnetic waves having a second polarization; and absorption of electromagnetic waves having the second polarization using a filter device at the external side of the bearer.

The present invention recognizes that undesirable single or multiple reflections of the electromagnetic waves reflected by an external object in the immediate vicinity of the antenna device and/or on a component of the antenna device itself can be reduced or eliminated through a suitable design of the antenna device.

According to the present invention, this recognition is taken into account by situating at least one repolarization device on the bearer at or on which at least one receive antenna device is situated. In this way, electromagnetic waves that impinge on the repolarization device instead of one of the receive antenna devices are re-polarized, i.e., are re-emitted with a second polarization. The second polarization is different from the first polarization. Advantageously, electromagnetic waves having the second polarization are absorbed by the filter device, so that they cannot undesirably impinge, for example after a further reflection, on the at least one receive antenna device.

In this way, measurements using the antenna device are negatively influenced by reflections to a significantly lower extent, and the precision of the measurements, for example of an angle estimation of the position of an external object relative to the antenna device, is improved.

Apart from runtime difference measurements, this is for example also advantageous if, for example using a single receive antenna device, a frequency spectrum is to be measured with regard to its intensity, because different frequencies can be reflected by different surfaces and materials in different fractions, so that each additional reflection can give rise to additional undesirable uncertainties.

A receive antenna device includes at least one receive antenna that can include in particular one or more patch elements. A receive antenna device can also include a corresponding evaluation electronics unit. However, a common evaluation electronics unit can also be provided for a plurality of, or for all, receive antenna devices.

In general, a polarization of an electromagnetic wave is a spatial orientation of the electrical or magnetic field of an electromagnetic wave. A polarization of an electromagnetic wave is to be understood in particular as a circular or a linear polarization. The first and second polarization are advantageously as different from one another as possible. That is, if the first polarization is a first linear polarization having a first polarization direction, the second polarization can preferably be a second linear polarization having a second polarization direction that is perpendicular to the first polarization direction.

The filter device can be fashioned as an absorption layer that absorbs electromagnetic waves having the second polarization more strongly than electromagnetic waves having the first polarization, in particular by a factor of ten to twenty or more. The absorbed electromagnetic waves having the second polarization are for the most part, preferably completely, converted to heat in the filter device.

According to an advantageous development, the at least one receive antenna device is situated on the external side of the bearer. According to a further advantageous development, the at least one repolarization device is situated on the external side of the bearer. In this way, the receive antenna device and/or the repolarization device can be produced particularly simply and with low technical outlay.

If an element is to be fashioned, or be, "at" an external side of the bearer, this is to be understood as meaning that the element is fashioned, or is, immediately on the bearer on the external side, i.e., the external surface, of the second bearer, or also that the element is fashioned, or is, indirectly or at a distance over this external side. If the element is to be fashioned, or be, "on" the external side of the bearer, this is to be understood as meaning that it is fashioned, or is, immediately on the external side, i.e., the external surface, of the bearer. If the first element is to be situated in relation to a second element in a particular way, this is not necessarily intended to determine that the second element has to be already fashioned when the first element is fashioned. Rather, here an end state is described, which a person skilled in the art will know how to produce in a manner corresponding to the description.

According to a further advantageous development, a first multiplicity of receive antenna devices and a second multiplicity of repolarization devices are situated on the external side of the bearer. According to a further advantageous development, the first multiplicity of receive antenna devices and the second multiplicity of repolarization devices cover at least 50% of the external side of the bearer, particularly preferably at least 75%, in particular at least 90%. In this way, a reflection of electromagnetic waves having the first polarization on the external side of the bearer is minimized.

According to a further advantageous development, the antenna device has a radome for the at least one receive antenna device, the filter device being fashioned in the radome. Radomes protect the receive antenna device, in particular a receive antenna of the receive antenna device, from external influences. By combining the radome with the filter device, a savings of space and a reduced technical outlay in production are enabled. According to a further advantageous development, the filter device is fashioned by conductive threads placed in the radome, in particular non-metallic conductive threads. The conductive threads are preferably made of graphite, or include graphite.

According to a further advantageous development, the antenna device includes a covering device situated on the external side of the bearer, the filter device being situated between the external side of the bearer and the covering device. The covering device can in particular be a bumper for a vehicle or a bumper of a vehicle. A vehicle is to be understood in particular as a motor vehicle, a road vehicle, a railway vehicle, a water vehicle, and/or an aircraft. The antenna device according to the present invention can advantageously be integrated in the covering device.

According to a further advantageous development, the antenna device includes at least one transmit antenna device capable of emitting electromagnetic waves having the first polarization. The transmit antenna device can also be fashioned to produce the electromagnetic waves that are to be emitted. The transmit antenna device includes at least one transmit antenna, for example including one or more patch elements. For the emission of the electromagnetic wave having the first polarization, the transmit antenna device can be connected to a signal source and/or coupled to a polarization filter, which can each be part of the antenna device.

According to a further advantageous development, a first multiplicity of receive antenna devices and a second multiplicity of repolarization devices are situated on the external side of the bearer. In particular, the at least one transmit antenna device is situated on the external side of the bearer. Preferably, the first multiplicity of receive antenna devices and the second multiplicity of repolarization devices and the at least one transmit antenna device together cover at least 50% of the external side of the bearer, particularly preferably at least 75%, in particular at least 90%.

BRIEF DESCRIPTION OF THE DRAWINGS

In the following, the present invention is explained in more detail on the basis of the exemplary embodiments presented in the figures.

DETAILED DESCRIPTION OF EXAMPLE EMBODIMENTS

Figure 1:
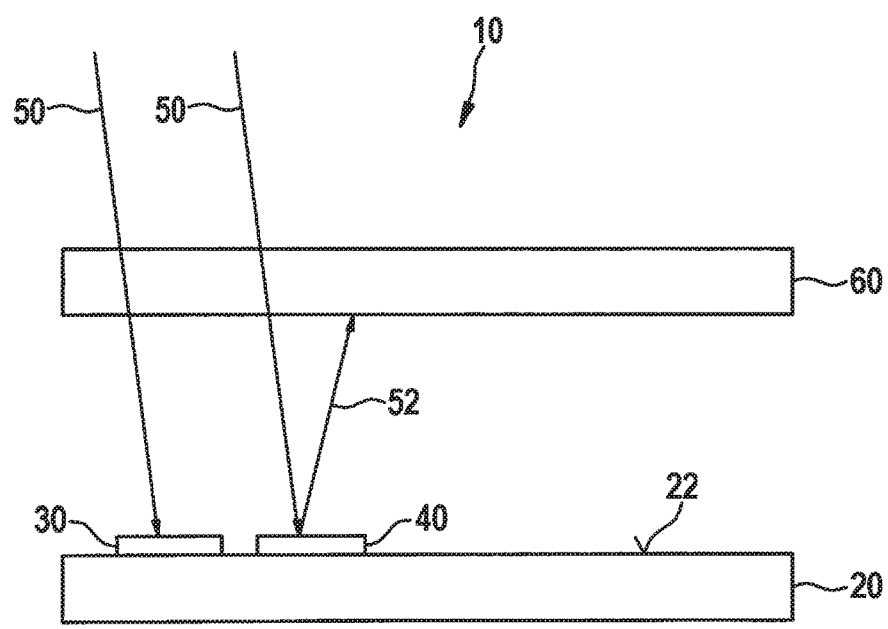
FIG. 1 shows a schematic side view of an antenna device 10 according to a specific embodiment of the present invention.

In all the Figures, identical or functionally identical elements and devices have been provided with the same reference characters, unless otherwise indicated. The numbering of method steps is provided for clarity, and in particular is not intended to imply a particular temporal sequence, unless otherwise indicated. In particular, a plurality of method steps can also be carried out simultaneously. Schematic drawings are not necessarily to scale, if not explicitly otherwise indicated.

FIG. 1 shows a schematic side view of an antenna device 10 according to a specific example embodiment of the present invention.

Antenna device 10 for receiving electromagnetic waves includes a bearer 20 having an external side 22. At, in particular on, external side 22 there is situated a receive antenna device 30 for receiving electromagnetic waves having a first polarization 50.

Moreover, at external side 22 of bearer 20, in particular on external side 22, there is situated at least one repolarization device 40 that is fashioned to re-emit electromagnetic waves impinging on repolarization device 40 having first polarization 50 as electromagnetic waves having a second polarization 52.

At external side 22, in particular at a distance from external side 22, there is situated a filter device 60 that is fashioned to absorb electromagnetic waves having second polarization 52.

Figure 2:
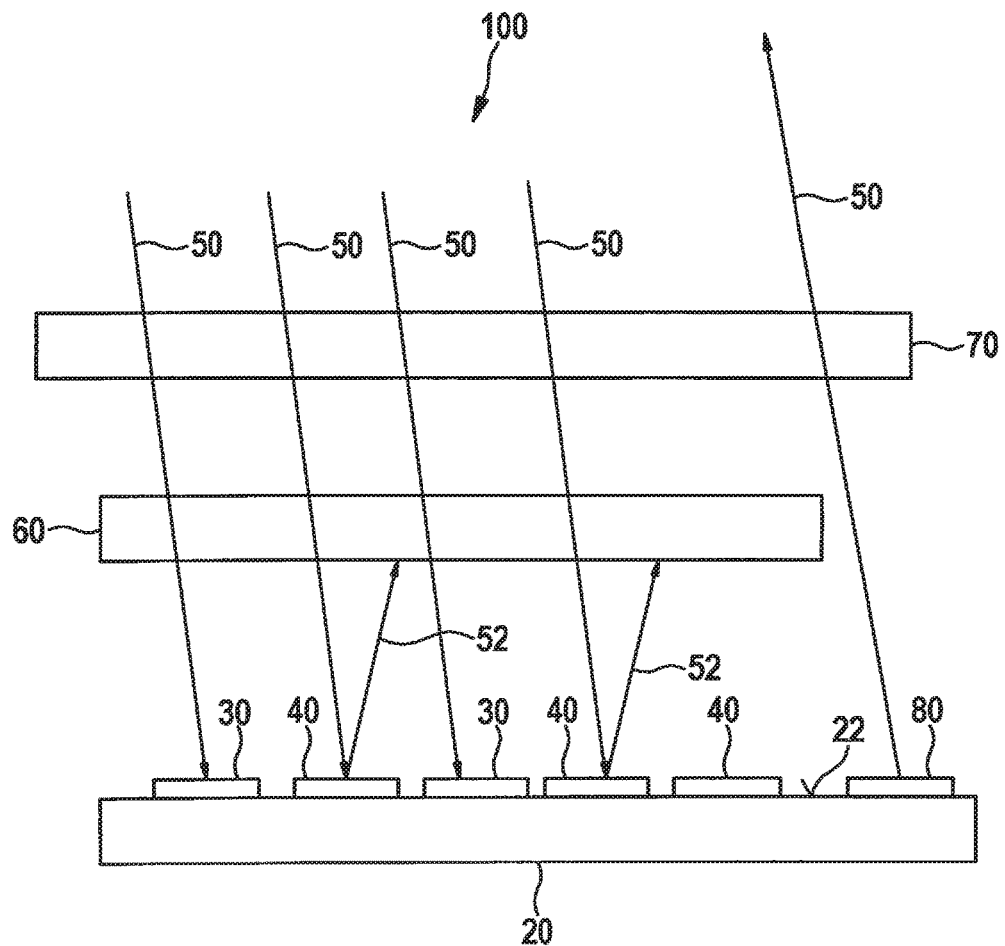
FIG. 2 shows a schematic side view of an antenna device 100 according to a further specific embodiment of the present invention.

FIG. 2 shows a schematic side view of an antenna device 100 according to a further specific embodiment of the present invention. Antenna device 100 is a variant of antenna device 10 and, compared thereto, has a first multiplicity (here: two) of receive antenna devices 30, as well as a second multiplicity (here: three) of repolarization devices 40, at, in particular on, external side 22 of bearer 20. Receive antenna devices 30 and repolarization devices 40 can be distributed in two dimensions at external side 22 of bearer 20.

Antenna device 100 has in addition a transmit antenna device 80 on external side 22 of bearer 20, by which electromagnetic waves can be emitted having first polarization 50. Transmit antenna device 80 can include a signal source and/or a polarization filter for producing the electromagnetic waves having first polarization 50 that are to be emitted.

Transmit antenna device 80 and repolarization devices 40 are fashioned such that first polarization and second polarization 50, 52 are two different linear polarizations standing perpendicular to one another.

In antenna device 100, filter device 60 is situated between external side 22 and a covering device 70 that is fashioned for example as a bumper of a vehicle, or can be used or is used as a bumper of a vehicle. Filter device 60 is realized by a conductive thread, for example made of graphite, placed in a radome. In particular, covering device 70 is situated between external side 22 of bearer 20 and a direction from which electromagnetic waves sent out by transmit antenna device 80 and reflected by external objects are most frequently to be expected. Preferably, filter device 60 is situated between external side 22 of bearer 20 and the direction from which the electromagnetic waves sent out by transmit antenna device 80 and reflected by external objects are most frequently to be expected.

Figure 3:
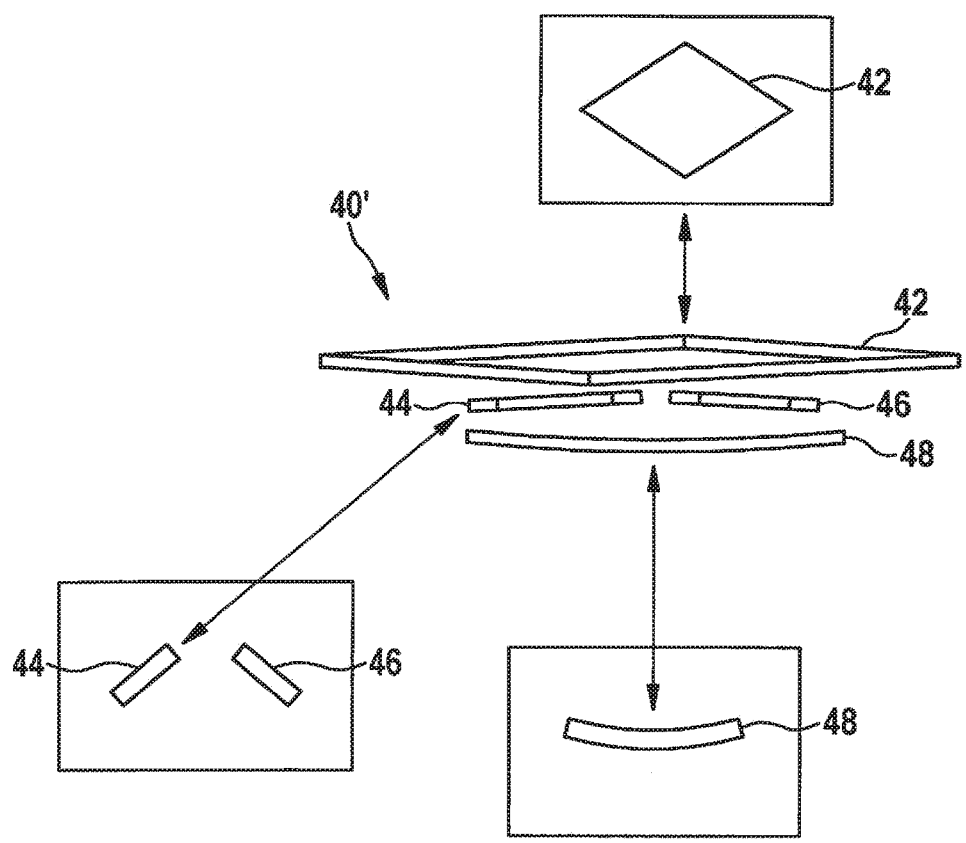
FIG. 3 shows a schematic view of a possible realization of a repolarization device 40'.

FIG. 3 shows a schematic view of a possible realization of a repolarization device 40' such as can be used in the antenna system according to the present invention, in particular antenna system 10 or 100.

Repolarization device 40' includes a dragon-shaped metallic patch 42 and a metallic microstrip line 48 buried thereunder. Patch 42 is coupled to microstrip line 48 via two coupling slits 44, 46. Patch 42, microstrip line 48, and coupling slits 44, 46 are preferably situated on different copper layers and are not galvanically connected to one another. Electromagnetic waves impinging on patch 42 having first polarization 50 are, given a corresponding configuration of repolarization device 40, received via patch 42 and are coupled into buried microstrip line 48 via a first coupling slit 44. There, the electromagnetic waves run to a second coupling slit 46, are again coupled into patch 42, and are then radiated by patch 42. Second coupling slit 46 is rotated by 90° relative to first coupling slit 44, causing a rotation of the polarization of the electromagnetic waves by 90°.

In FIG. 3, patch 42, coupling slits 44, 46, and microstrip line 48 are each shown once in a schematic oblique view and once in a schematic top view.

Figure 4:
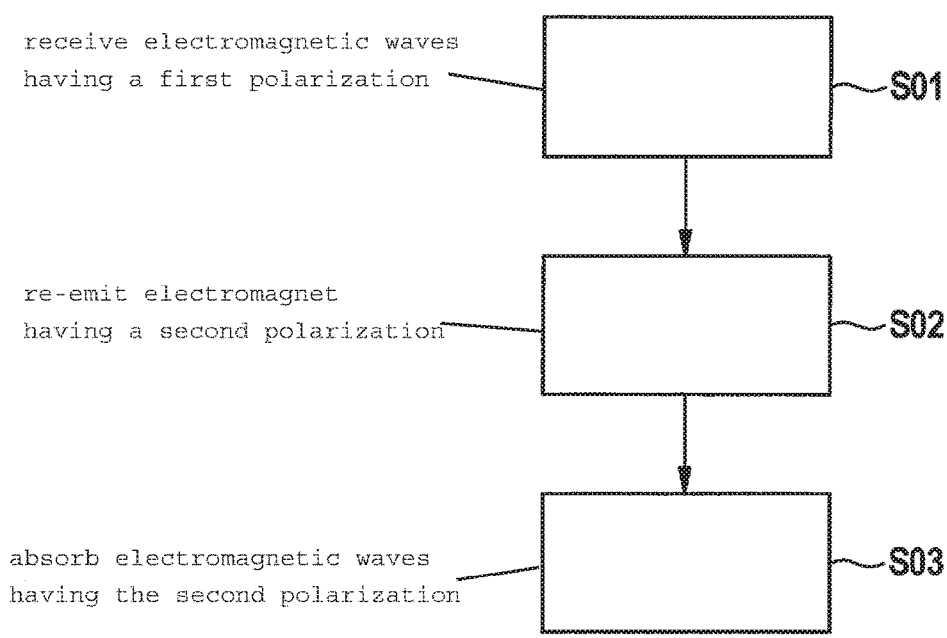
FIG. 4 shows a schematic flow diagram for the explanation of a method for operating an antenna device according to a further specific embodiment of the present invention.

FIG. 4 shows a schematic flow diagram for the explanation of a method for operating an antenna system according to a further specific embodiment of the present invention. The method according to the present invention can be used for the operation of an antenna system according to the present invention, and can be adapted with regard to all described or implied developments and variants of the antenna system according to the present invention, in particular antenna systems 10 and 100.

In a step S01, electromagnetic waves having a first polarization are received by at least one receive antenna device at an external side of the bearer.

In a step S02, electromagnetic waves impinging on a repolarization device 40; 40' at external side 22 of bearer 20 having first polarization 50 are re-emitted as electromagnetic waves having a second polarization 52.

In a step S03, electromagnetic waves having second polarization 52 are absorbed at least partly, preferably for the most part, particularly preferably completely, by a filter device 60 at external side 22 of bearer 20.

Although the present invention has been described above on the basis of preferred exemplary embodiments, it is not limited thereto, but rather can be modified in many ways. In particular, the present invention can be modified in many ways without departing from the core idea of the present invention.

What is claimed is:

1. An antenna device for receiving electromagnetic waves, comprising:
 a bearer;
 at least one receive antenna device situated at an external side of the bearer for receiving electromagnetic waves having a first polarization;
 at least one repolarization device situated at the external side of the bearer and configured to re-emit electromagnetic waves impinging on the repolarization device having the first polarization as electromagnetic waves having a second polarization; and
 a filter device situated at the external side of the bearer and configured to absorb electromagnetic waves having the second polarization.

2. The antenna device as recited in claim 1, wherein the at least one receive antenna device is situated on the external side of the bearer.

3. The antenna device as recited in claim 2, wherein a first multiplicity of receive antenna devices and a second multiplicity of repolarization devices are situated on the external side of the bearer, and wherein the first multiplicity of receive antenna devices and the second multiplicity of repolarization devices cover at least 50% of the external side of the bearer.

4. The antenna device as recited in claim 1, further comprising:
 a radome for the at least one receive antenna device, wherein the filter device is configured in the radome.

5. The antenna device as recited in claim 4, wherein the filter device is configured by conductive threads placed in the radome.

6. The antenna device as recited in claim 1, further comprising:
 a covering device situated at the external side of the bearer, wherein the filter device is situated between the external side of the bearer and the covering device.

7. The antenna device as recited in claim 6, wherein the covering device is configured as a bumper for a motor vehicle.

8. The antenna device as recited in claim 1, further comprising:

at least one transmit antenna device by which electromagnetic waves having the first polarization can be emitted.

9. The antenna device as recited in claim 8, wherein a first multiplicity of receive antenna devices and a second multiplicity of repolarization devices are situated on the external side of the bearer, the at least one transmit antenna device is situated on the external side of the bearer, and wherein the first multiplicity of receive antenna devices and the second multiplicity of repolarization devices and the at least one transmit antenna device together cover at least 50% of the external side of the bearer.

10. The antenna device as recited in claim 1, wherein the at least one repolarization device is situated on the external side of the bearer.

11. The antenna device as recited in claim 1, wherein the at least one receive antenna device and the at least one repolarization device are situated on the external side of the bearer.

12. A method for operating an antenna device for receiving electromagnetic waves, comprising:
- receiving electromagnetic waves having a first polarization by at least one receive antenna device at an external side of a bearer;
- re-emitting electromagnetic waves impinging on a repolarization device at the external side of the bearer having the first polarization as electromagnetic waves having a second polarization; and
- absorbing electromagnetic waves having the second polarization by a filter device at the external side of the bearer.

* * * * *